United States Patent [19]

Zehavi et al.

[11] Patent Number: 6,148,042
[45] Date of Patent: *Nov. 14, 2000

[54] COHERENT SIGNAL PROCESSING FOR CDMA COMMUNICATION SYSTEM

[75] Inventors: Ephraim Zehavi, Haifa, Israel; Serge Willenegger, San Diego; Joseph P. Odenwalder, Del Mar, both of Calif.

[73] Assignee: Qualcomm Incorporated, San Diego, Calif.

[ * ] Notice: This patent is subject to a terminal disclaimer.

[21] Appl. No.: 09/287,550

[22] Filed: Apr. 5, 1999

Related U.S. Application Data

[63] Continuation of application No. 08/687,899, Jul. 29, 1996.

[51] Int. Cl.$^7$ ........................................................ H03D 1/00
[52] U.S. Cl. ........................................ 375/340; 370/335
[58] Field of Search ........................... 375/346, 340, 375/205, 324, 329; 370/320, 335

[56] References Cited

U.S. PATENT DOCUMENTS

| | | | |
|---|---|---|---|
| 4,002,991 | 1/1977 | Ogita | 328/139 |
| 4,017,798 | 4/1977 | Gordy et al. | 325/42 |
| 4,048,563 | 9/1977 | Osborne | 325/58 |
| 4,189,677 | 2/1980 | Cooper et al. | 325/321 |
| 4,247,939 | 1/1981 | Stromswold et al. | 375/1 |
| 4,291,409 | 9/1981 | Weinberg et al. | 375/1 |
| 4,309,769 | 1/1982 | Taylor, Jr. | 375/1 |
| 4,484,335 | 11/1984 | Mosley et al. | 375/1 |
| 4,501,002 | 2/1985 | Auchterlonie | 375/86 |
| 4,730,340 | 3/1988 | Frazier, Jr. | 375/1 |
| 4,901,307 | 2/1990 | Gilhousen et al. | 370/18 |
| 5,056,109 | 10/1991 | Gilhousen et al. | 375/1 |
| 5,103,459 | 4/1992 | Gilhousen et al. | 375/1 |
| 5,109,390 | 4/1992 | Gilhousen et al. | 375/1 |
| 5,270,718 | 12/1993 | DiDomizio | 342/147 |
| 5,309,474 | 5/1994 | Gilhousen et al. | 375/1 |
| 5,414,728 | 5/1995 | Zehavi | 375/200 |
| 5,442,627 | 8/1995 | Viterbi | 375/205 |
| 5,465,269 | 11/1995 | Schaffner et al. | 375/200 |
| 5,506,865 | 4/1996 | Weaver, Jr. | 375/205 |
| 5,530,716 | 6/1996 | Lipa | 375/206 |
| 5,550,811 | 8/1996 | Kaku et al. | 370/209 |

FOREIGN PATENT DOCUMENTS

| | | | |
|---|---|---|---|
| 9413066 | 6/1994 | WIPO | H04B 1/66 |

OTHER PUBLICATIONS

Viterbi, et al. "Nonlinear Estimation of PSK–Modulated Carrier Phase with Application to Burst Digital Transmission" IEEE Transactions on Information Theory IT–29(4): 543–551 (Jul. 1983).

*Primary Examiner*—Temesghen Ghebretinsae
*Attorney, Agent, or Firm*—Philip R. Wadsworth; Kent D. Baker; Sean English

[57] ABSTRACT

A method and apparatus for variable rate communication incorporating coherent signal processing and combining is described. Within the receive system, vectors of in-phase and quadrature-phase Walsh correlator output values are generated for each Rake finger over each Walsh symbol period. In-phase and quadrature-phase reference values are generated for each of the Rake fingers by combining the in-phase and quadrature-phase correlator outputs of the most likely Walsh symbols over a series of Walsh symbol periods. The output energies are calculated as the sum of squared in-phase and quadrature-phase values. The vectors of in-phase and quadrature-phases values are then projected on the in-phase and quadrature-phase reference values and weighted by the reference amplitude. The reference amplitude is the square root of the sum of squared in-phase and quadrature-phase values. The vectors of projected and weighted values are summed via coherently combining, and the corresponding values from the other Rake fingers used to obtain a resultant vector of coherently demodulated Walsh correlator outputs.

2 Claims, 11 Drawing Sheets

COHERENT SIGNAL PROCESSING FOR CDMA COMMUNICATION SYSTEM

This is a continuation U.S. Pat. No. 5,987,076, entitled "Coherent Signal Processing for CDMA Communication System", issued on Nov. 16, 1999.

BACKGROUND OF THE INVENTION

I. Field of the Invention

The present invention relates to communications. More particularly, the present invention relates to a novel and improved method and apparatus for variable rate communication incorporating coherent signal processing.

II. Description of the Related Art

Figure 1:
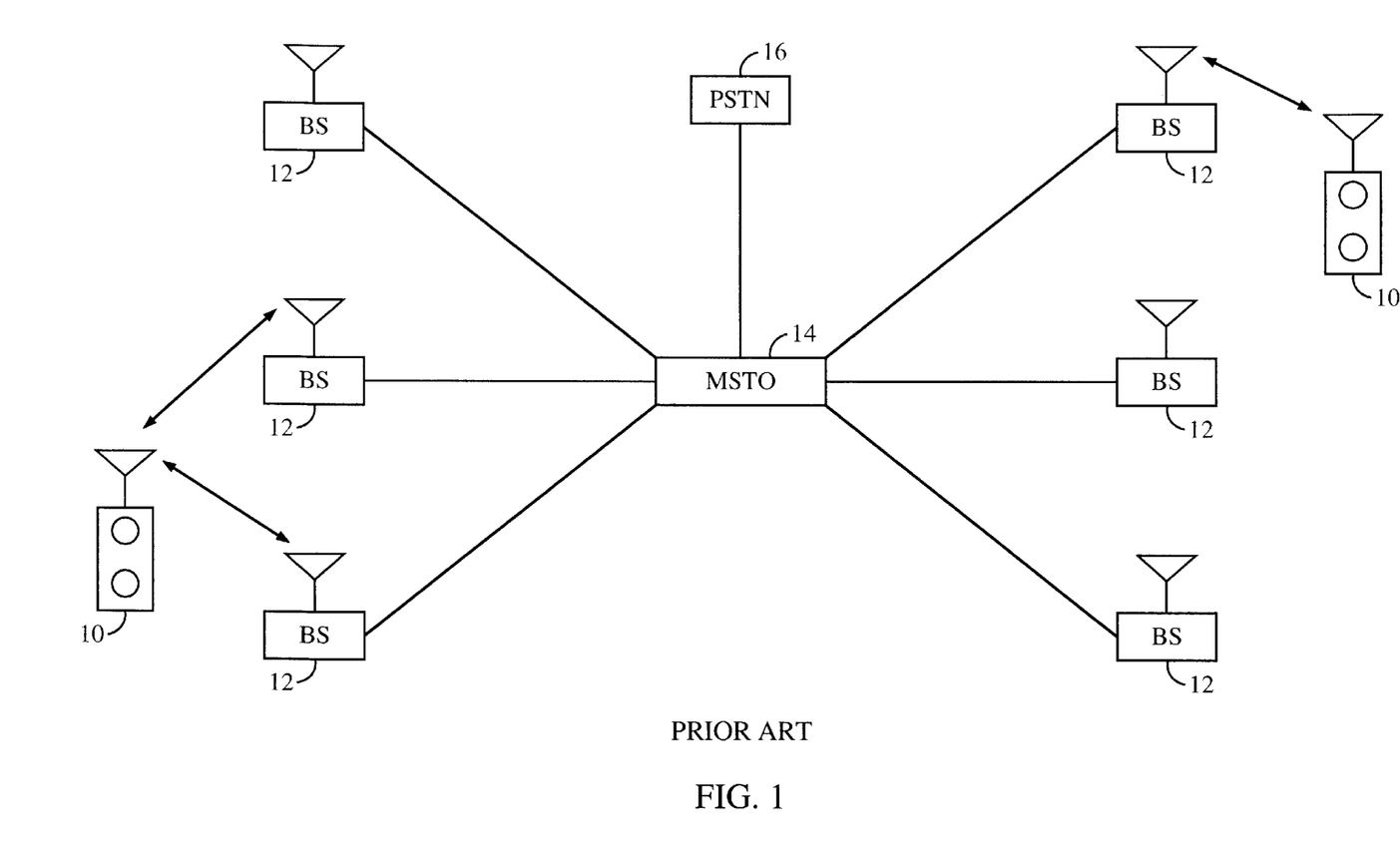
FIG. 1 is a block diagram of a cellular telephone system.

FIG. 1 is an illustration of a wireless cellular telephone system configured in accordance with the IS-95 over-the-air interface standard (The IS-95 standard). The IS-95 standard has been adopted by the Telecommunications Industry Association (TIA) and utilizes code division multiple access (CDMA) modulation techniques to provide greater capacity and more robust performance over prior art wireless telecommunications technologies. In accordance with the IS-95 standard, subscriber units 10 (usually cellular telephones) establish bi-directional links with one or more base stations 12 via the use of radio frequency (RF) electromagnetic signals in order to conduct mobile telephone calls or other communications. Each bi-directional link consists of a forward link RF signal transmitted from a base station 12 to a subscriber unit 10 and a reverse link RF signal transmitted from a subscriber unit 10 to a base station 12. The telephone call or other communication is further processed from each base station 12 by way of mobile telephone switching office (MTSO) 14 and public switched telephone network 16 (PSTN), which are usually coupled to one another using wire line connections.

Figure 2:
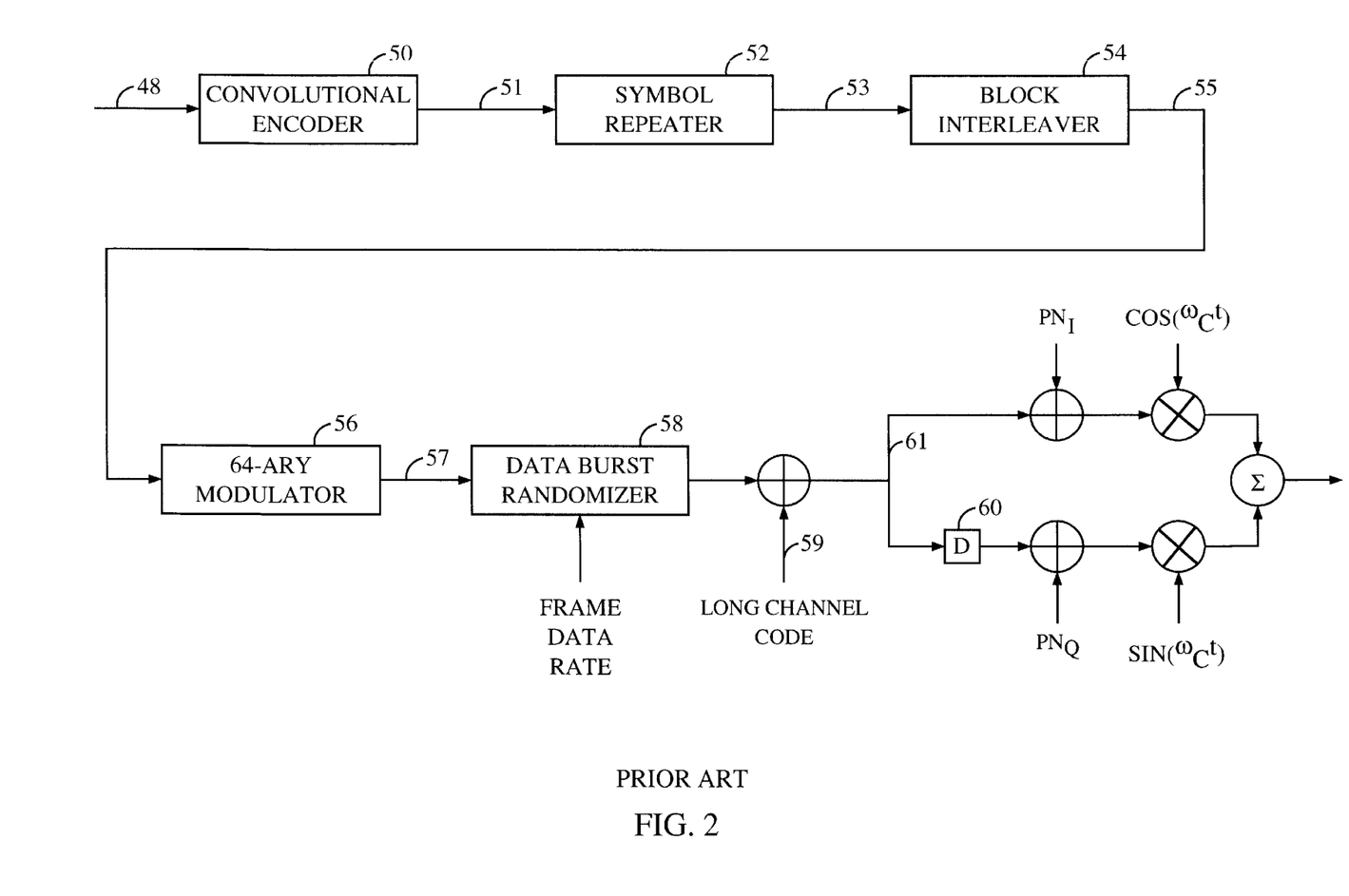
FIG. 2 is a block diagram of the reverse link transmit signal processing portion of a subscriber unit configured in accordance with the IS-95 over-the-air interface standard.

FIG. 2 is a block diagram of a reverse link transmit signal processing system employed by a subscriber unit 10 in accordance with the IS-95 standard. Data 48 is provided to convolutional encoder 50 in 20 ms segments, called frames, at one of four rates referred to as "full rate", "half rate", "quarter rate", and "eighth rate" respectively as each frame contains half as much data as the previous and therefore transmits data at half the rate. Data 48 is typically variable rate vocoded audio information where lower rate frames are used when less information is present such as during a pause in a conversation. Convolution encoder 50 convolutionally encodes data 48 producing encoded symbols 51, and symbol repeater 52 generates repeated symbols 53 by symbol repeating encoded symbols 51 by an amount sufficient to generate a quantity of data equivalent to a full rate frame. For example, three additional copies of a quarter rate frames are generated for a total of four copies while no additional copies of a full rate frame are generated. Block interleaver 54 then block interleaves the repeated symbols 53 to generate interleaved symbols 55. Modulator 56 performs 64-ary modulation on interleaved symbols 55 to produce Walsh symbols 57. That is, one of sixty-four possible orthogonal Walsh codes, each code consisting of sixty-four modulation chips, is transmitted for every six interleaved symbols 55. Data burst randomizer 58 performs gating, using frame rate information, on Walsh symbols 57 in pseudorandom bursts such that only one complete instance of the data is transmitted.

Figure 3:
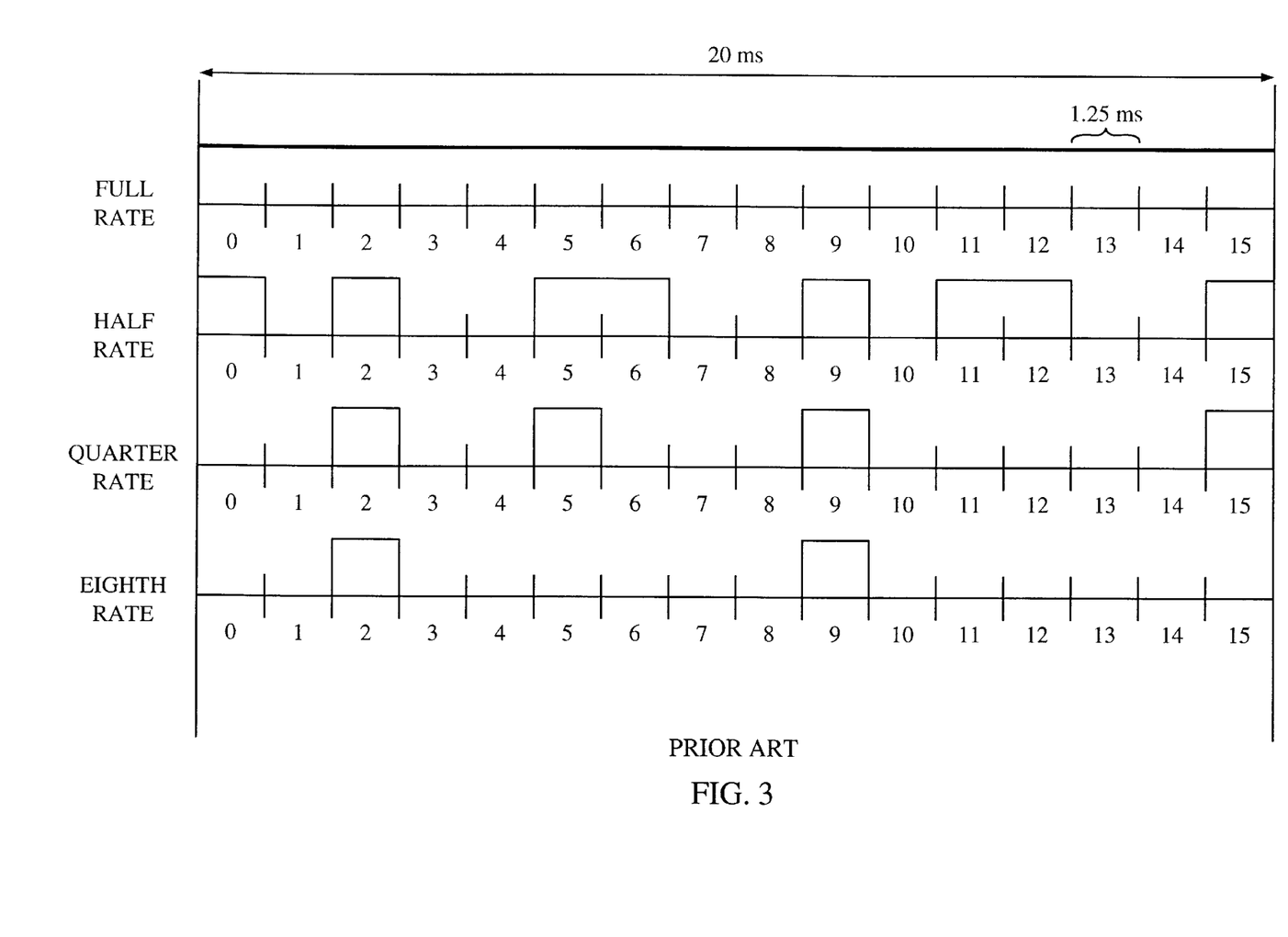
FIG. 3 is a timing diagram illustrating the operation of a data burst randomizer in accordance with the IS-95 over-the-air interface standard.

A timing diagram illustrating an exemplary gating performed by data burst randomizer 58 during the transmission of a frame of data is shown in FIG. 3. The time intervals associated with the transmission of a frame is divided into sixteen burst slots. Each burst slot is referred to as a "power control group" because a receiving base station typically makes a power strength measurement on each burst slot received in order to transmit power control information to the subscriber unit. In the exemplary embodiment shown, data is transmitted during all sixteen power control groups for a full rate frame and during power control groups 0, 2, 5, 6, 9, 11, 12, and 15 for a half rate frame. For a quarter rate frame data is transmitted during power control groups 2, 5, 9, and 15, and during an eighth rate frame data is transmitted during power control groups 2 and 9. This is just a set of exemplary gatings. In accordance with the IS-95 standard, the repetition performed by symbol repeater 52 and the interleaving performed by block interleaver 54 are such that the gating of the data as described above causes one instance of the data in the frame to be sent.

The gated Walsh chips are then direct sequence modulated using a pseudorandom (PN) long channel code 59 at rate of four long channel code chips to each Walsh chip generating modulated data 61. The long channel code is unique for each subscriber unit 10 and is known by each base station 12. Modulated data 61 is duplicated with the first copy being "spread" via modulation with an in-phase pseudorandom spreading code ($PN_I$) producing I-channel data, and the second copy is delayed one half a spreading code chip by delay 60 and spread via modulation with a quadrature-phase spreading code ($PN_Q$) producing Q-channel data. The $PN_I$ code and $PN_Q$ code spread data are each low pass filtered (not shown), before being used to modulate in-phase and quadrature-phase carrier signals respectively. The modulated in-phase and quadrature-phase carrier signals are then summed together before being transmitted to a base station or other receive system (not shown).

Figure 4:
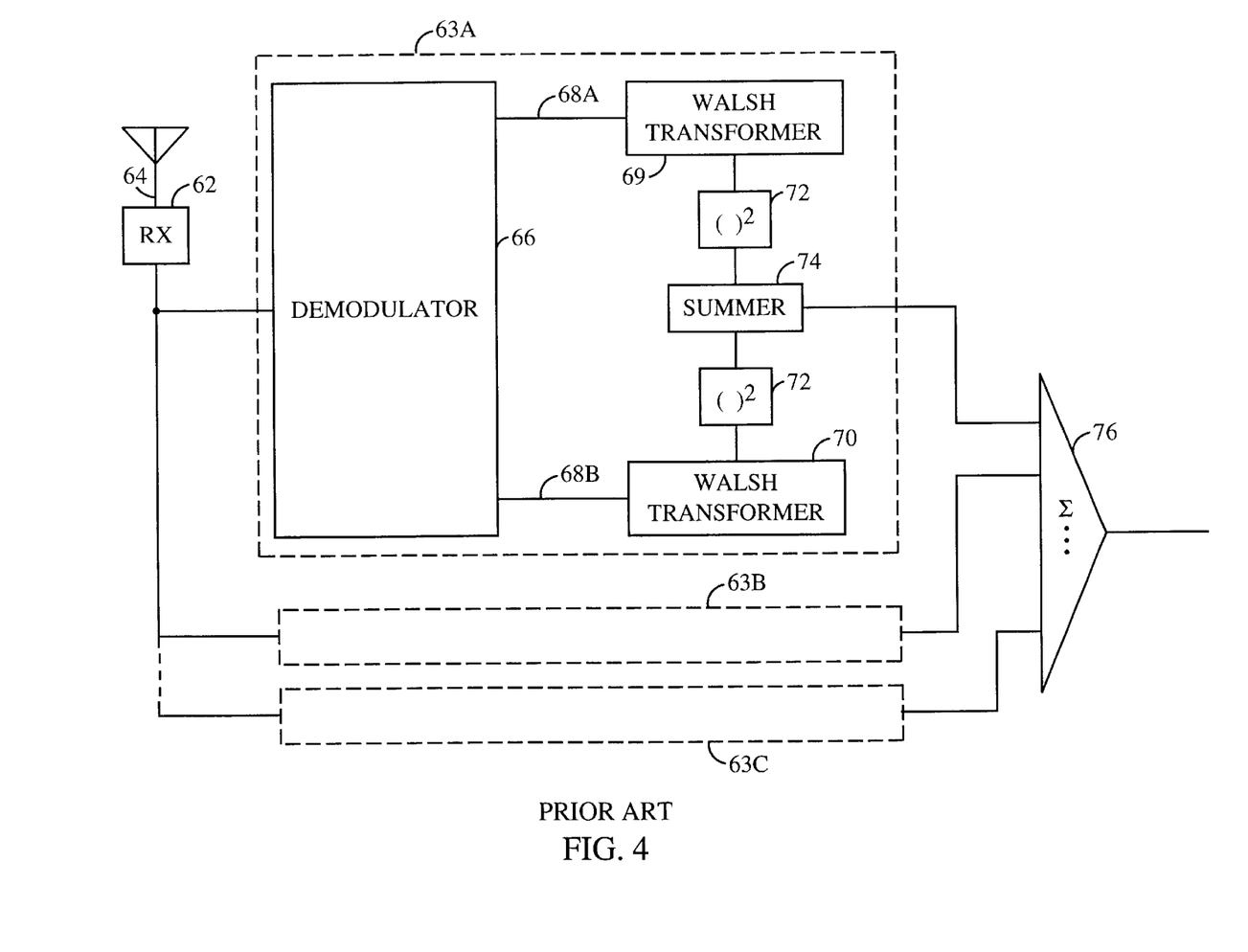
FIG. 4 is a block diagram of a prior art reverse link receive processing system configured to processing a IS-95 compliant reverse link signal.

FIG. 4 is a block diagram of a receive processing portion of a base station when configured in accordance with prior art methods for receive processing a reverse link signal generated in accordance with the IS-95 standard. The processing shown is consistent with that described in U.S. Pat. No. 5,442,627 issued Aug. 15, 1995. Other patents related to prior art methods for receive processing include U.S. Pat. Nos. 5,103,459 and 5,309,474, both entitled "SYSTEM AND METHOD FOR GENERATING SIGNAL WAVEFORMS IN A CDMA CELLULAR TELEPHONE SYSTEM" and issued Apr. 7, 1992 and May 3, 1994 respectively, as well as U.S. Pat. No. 5,109,390 entitled "DIVERSITY RECEIVER IN A CDMA CELLULAR TELEPHONE SYSTEM" issued Apr. 28, 1992. Each of the above referenced patents are assigned to the assignee of the present invention and incorporated herein by reference.

During operation, the IS-95 reverse link signal is received from antenna system 64 and downconverted to baseband and digitized by RF processing system (Rx) 62, and the downconverted signals are applied to finger processors 63A, 63B, and 63C. As shown in the more detailed depiction of finger processor 63A, demodulator 66 demodulates the downconverted signal using the $PN_I$ code and $PN_Q$ code respectively, and sums the result of that demodulation for every four PN chips to generate I-channel and Q-channel data 68A and 68B. The I-channel and Q-channel data are then applied to Walsh transformer circuits 69 and 70 respectively, each of which correlates the despread data with the sixty four available Walsh codes, thereby generating a vector of sixty-four correlation values corresponding to the sixty four available Walsh codes for both the I-channel and Q-channel data. Each of the two vectors are then squared by squaring circuits 72, and the resulting two vectors of squared data are summed by summer 74. After the introduction of variable delay (not shown) to adjust for path differences, the vector of squared correlation values from summer 74 is summed with the other sets of squared correlation values generated by finger processors 63B and 63C by summer 76. Finger processors 63B and 63C are processing multipath instances of the same reverse link signal, if such multipath signals are available. The resulting vector of squared correlation values from summer 76 is then used to form soft decisions for each of the six symbols corresponding to a Walsh symbol sequence. These soft decisions are deinterleaved and Viterbi decoded to obtain estimates of the transmitted data. Various schemes for performing the soft decisions are described in the above referenced ('627) patent.

The above described method and apparatus for receive processing system data employs noncoherent demodulation. The use of noncoherent demodulation is generally well suited for processing an IS-95 reverse link signal since no pilot signal is provided for determining the phase of the reverse link signal and the energy level of the data is kept at the minimum necessary to allow for successful communication. Additionally, noncoherent receive processing is generally less complex than coherent receive processing. However, noncoherent demodulation provides reduced performance when compared to coherent processing, including a reduction in the gains achieved by employing Rake receivers in which multipath instances of the reverse link signal, referred to as fingers, are summed together at the receive system as described above. This reduction in the benefits achieved from Rake reception makes it necessary for a subscriber unit to transmit the reverse link signal with additional power relative to that necessary if coherent signal processing were employed. Within an interface-limited system such as CDMA, the use of additional power reduces the overall data carrying capacity of the reverse link, and therefore the total number of calls that can be conducted. If, however, a method for coherently processing and combining a reverse link signal generated in accordance with the IS-95 standard could be devised, the required transmit power of a reverse link signal could be reduced, and thus the reverse link capacity of an IS-95 or other CDMA telecommunication system could be enhanced. Therefore, such a method and apparatus would be highly desirable.

SUMMARY OF THE INVENTION

The present invention is a novel and improved method and apparatus for variable rate communication incorporating coherent signal processing and combining. Within the receive system, vectors of in-phase and quadrature-phase Walsh correlator output values are generated for each Rake finger over each Walsh symbol period. In-phase and quadrature-phase reference values (i.e., unmodulated) are generated for each of the Rake fingers by combining the in-phase and quadrature-phase correlator outputs of the most likely Walsh symbols over a series of Walsh symbol periods. The most likely Walsh symbols are determined on a symbol-by-symbol basis by summing the Walsh correlator output energies from each finger and selecting the largest. The output energies are calculated as the sum of squared in-phase and quadrature-phase values.

The vectors of in-phase and quadrature-phase values are then projected on the in-phase and quadrature-phase reference values and weighted by the reference amplitude. The reference amplitude is the square root of the sum of squared in-phase and quadrature-phase values. If the correlator outputs and references are represented as complex numbers, this projection and weighting is equivalent to a dot product.

Thus, the projected and weighted values are equal to the in-phase correlator output times the in-phase reference value plus the quadrature-phase correlator output times the quadrature-phase reference value.

The vectors of projected and weighted values are summed via coherently combining, and the corresponding values from the other Rake fingers used to obtain a resultant vector of coherently demodulated Walsh correlator outputs. The coherently demodulated Walsh correlator outputs are used to form soft decisions that are deinterleaved and soft-decision Viterbi decoded.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

A novel and improved method and apparatus for variable rate communication incorporating coherent signal processing is described. In the following description, various signal processing systems and the arrangements thereof are described in detail. It will be apparent to one skilled in the art that a variety of well known methods and apparatus for implementing such signal processing systems may be used including the use of digital signal processors and digital microprocessors controlled by software, or custom designed integrated circuits, with the latter being used in the preferred embodiment. In other instances throughout the application, various well known systems are described in block form. This is done in order to avoid unnecessarily obscuring the disclosure of the present invention.

Where multiple instances of a particular system are shown, a single instance of that system may generally be substituted, with the use of that system being time shared between the various functions performed by the multiple systems. In general, the bits, data, symbols and signals referred to throughout the application constitute electronic voltage, charge, or electromagnetic wave dependent representations, or a combination thereof, of various types of information including audio information generated via the sampling of physical phenomena such as sound waves, voltages generated for the purpose of controlling other electronic systems, or human or computer generated digital data. Also systems other than land based wireless cellular telecommunication systems can benefit from the use of the present invention, including satellite based wireless telecommunication systems, point-to-point wireless systems, or wire based systems in which modulated sinusoids are used to transmit data including coaxial cable based communication systems. Furthermore, while the invention is set forth in the context of a system that processes a signal generated in accordance the reverse link portion of the IS-95 standard, and is particularly suited to the processing of such a signal, the invention may be utilized in the context of processing signals that are not generated in accordance with the IS-95 standard, including, but not limited to, signals generated in accordance with CDMA techniques and transmitted using one or more duty cycles.

Figure 5:
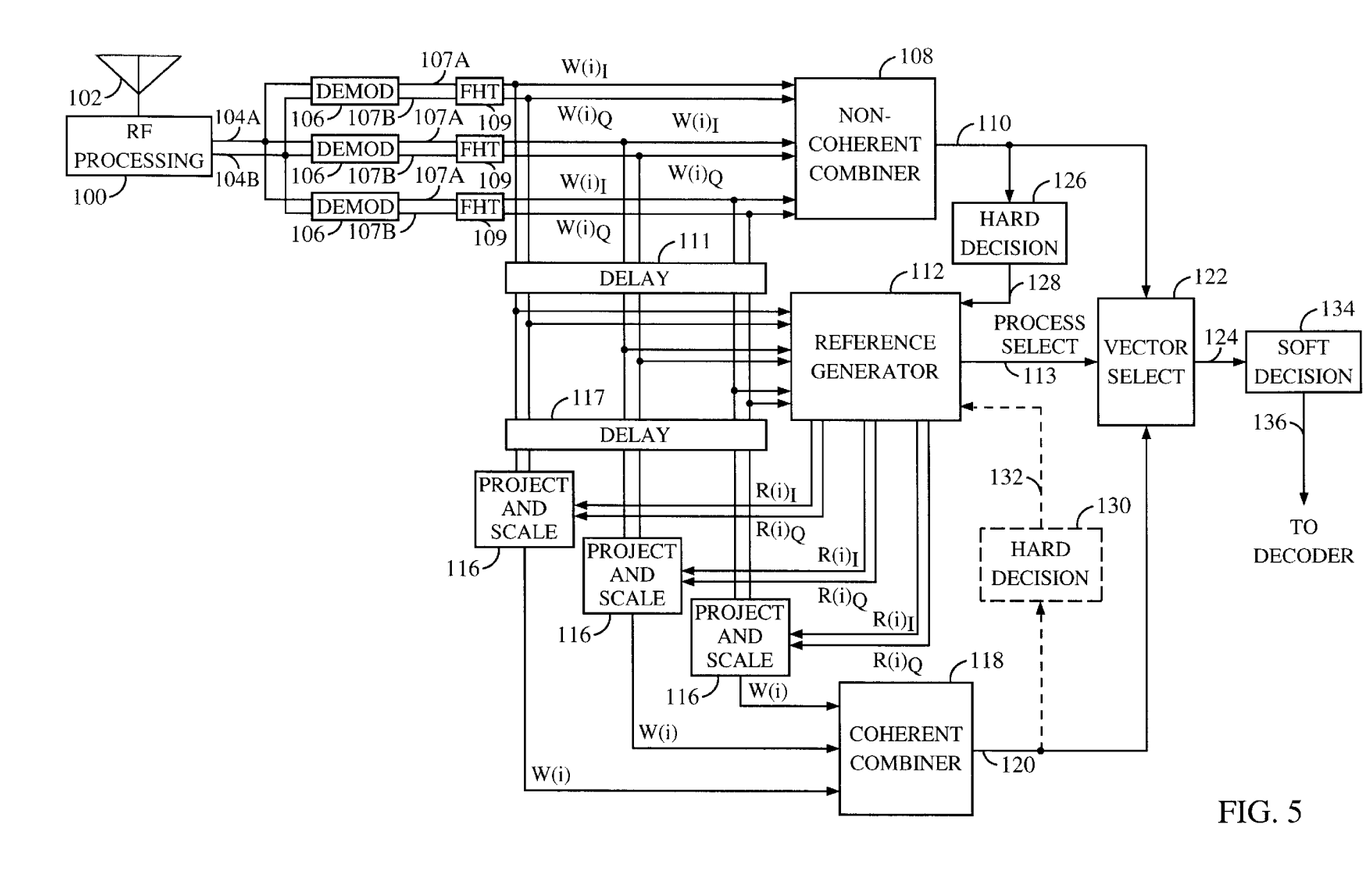
FIG. 5 is a block diagram of a reverse link receive processing system when configured in accordance with one embodiment of the invention.

FIG. 5 is a block diagram of the receive processing portion of a base station or other reverse link receive system configured in accordance with one embodiment of the invention. During operation, RF processing system 100 receives one or more instances of a reverse link signal generated in accordance with the IS-95 standard via antenna system 102, and provides digitized and downconverted in-phase receive samples 104a and quadrature-phase receive samples 104b to demodulators 106. The additional instances of the reverse link are generated via multipath phenomena such as reflection or multiple antennas and are referred to as "fingers." Each demodulator 106 processes the in-phase and quadrature-phase receive samples 104a and 104b for a finger via the use of time tracking, generating in-phase demodulation symbols 107a and quadrature-phase demodulation symbols 107b which are received by fast Hadamard transform (FHT) systems 109. Each FHT 109 performs a fast Hadamard transform on both in-phase demodulation symbols 107a and quadrature-phase demodulation symbols 107b to generate corresponding in-phase Walsh symbol correlation vectors $W(i)_I$ and quadrature-phase Walsh symbol correlation vectors $W(i)_Q$, where i indicates the finger being processed.

Each vector $W(i)_I$ and $W(i)_Q$ contains sixty-four (64) Walsh symbol correlation values. While the receive system shown in FIG. 5 is configured to process three fingers, systems configured to process an alternative numbers of fingers including four are consistent with the operation of the present invention. Noncoherent combiner 108 combines the three fingers being processed in a noncoherent manner generating noncoherent correlation vector 110. Hard decision 126 determines the Walsh symbol most likely to have been transmitted using noncoherent correlation vector 110, and indicates that Walsh symbol via hard index 128. Hard index 128 is a six bit number indexing a corresponding one of the sixty four Walsh symbols. In the preferred embodiment of the invention the Walsh symbol most likely to have been transmitted is that associated with the greatest Walsh symbol correlation value in the corresponding noncoherent correlation vector 110.

Delay 111 stores in-phase and quadrature-phase Walsh symbol correlation vectors $W(i)_I$ and $W(i)_Q$ while noncoherent combiner 108 performs the noncoherent combining and hard decision 126 generates hard index 128. The delayed Walsh symbol correlation vectors $W(i)_I$ and $W(i)_Q$ are then applied to phase and scale reference generator 112, each of which generates reference $R(i)_I$ and $R(i)_Q$ for each finger using hard index 128 by performing amplitude averaging over a series of selected Walsh correlation values contained in a power control group. Reference $R(i)_I$ and $R(i)_Q$ respectively indicate the values of the in-phase component and quadrature-phase component of $i^{th}$ finger being processed, which in turn can readily be used to determine the phase offset of the corresponding finger. Alternative methods and formats for providing the phase or scale information, or both, including providing the phase offset in a single digital value, will be apparent to one skilled in the art, and are consistent with the operation of the present invention. The use of reference estimations generated as described above is preferred, however, as it minimizes the processing associated with projection and scaling of the soft decision data. Additionally, reference generator 112 generates process select 113 which indicates whether noncoherent correlation vector 110 or coherent correlation vector 120 (described below) are more likely to be accurate.

After being further delayed by delay 117, the in-phase and quadrature-phase Walsh symbol correlation vectors $W(i)_I$ and $W(i)_Q$ are projected and scaled by project and scale systems 116 using reference estimations $R(i)_I$ and $R(i)_Q$, yielding projected Walsh symbol correlation vectors $W(i)$. Coherent combiner 118 combines the projected Walsh symbol correlation vectors $W(i)$ in a coherent manner yielding coherent correlation vector 120.

Vector select 122 selects noncoherent correlation vector 110 or coherent correlation vector 120 as output vector 124 based on process select 113 from reference generator 112. Using output vector 124, soft decision 134 generates soft vector 136 comprised of six values. In the preferred embodiment of the invention soft vector 136 is generated in accordance with the dual maxima techniques described in the above referenced ('627) patent, although the use of other methods is consistent with the present invention. Soft vector 136 is then passed to a decoder (not shown) for further processing including deinterleaving and Viterbi decoding.

In one embodiment of the invention, hard decision 130, shown in dashed lines, is employed to generate coherent hard index 132 using coherent correlation vector 120. Coherent hard index 132 is the index for the Walsh correlation value within coherent correlation vector 120 most likely to have been transmitted. Within reference generator 112 coherent hard index 132 is used in addition to hard index 128 for generating references $R(i)_I$ and $R(i)_Q$. The use of coherent hard index 132 in addition to hard index 128 increases the accuracy with which reference generator 112 generates references $R(i)_I$ and $R(i)_Q$ at the expense of additional complexity.

Figure 6:
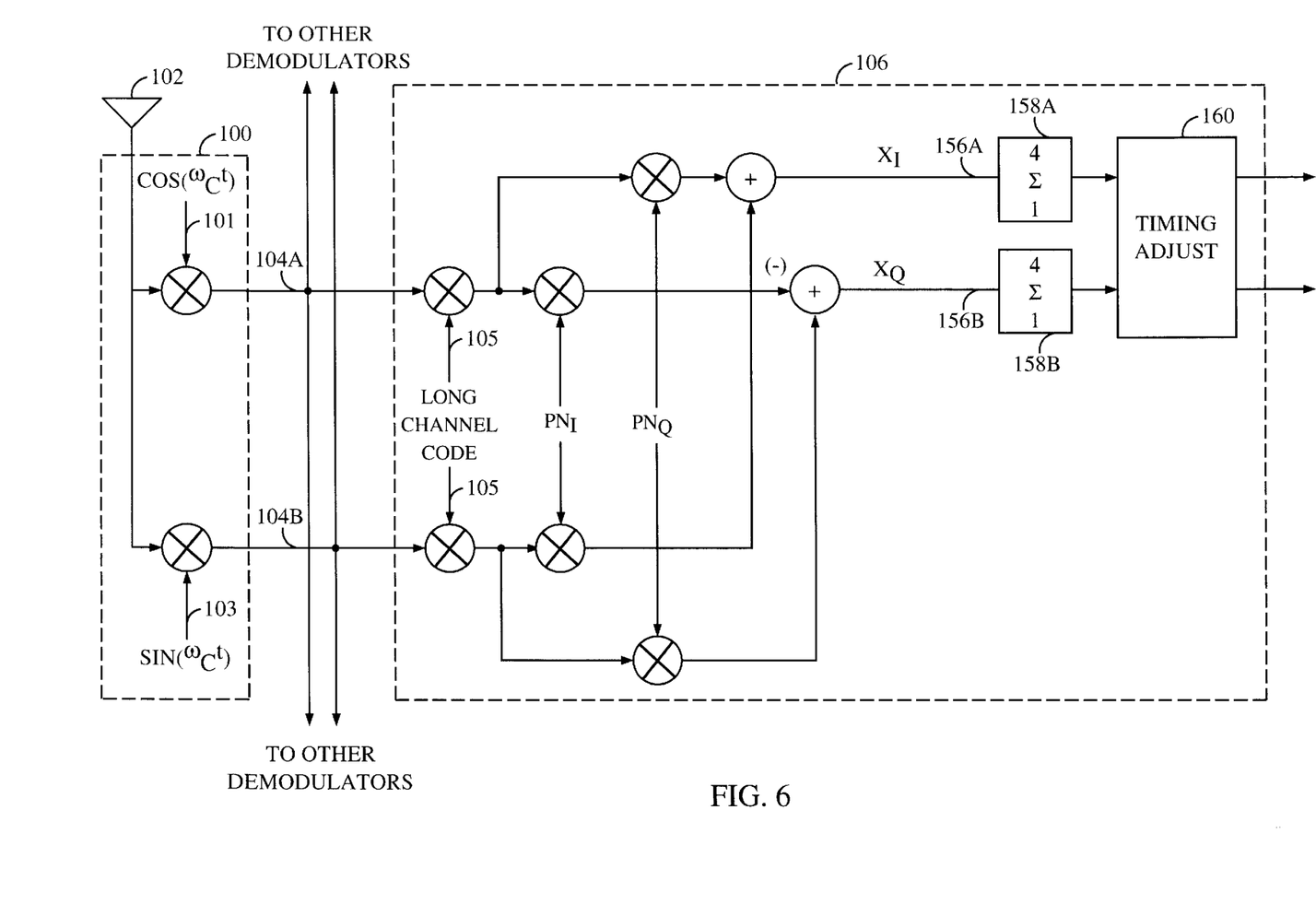
FIG. 6 is a block diagram of a radio frequency signal receive processing system and demodulator configured in accordance with one embodiment of the invention.

FIG. 6 is a block diagram of RF processing system 100 and a demodulator 106 when configured in accordance with the exemplary embodiment of the invention. RF signals are received via antenna system 102 and mixed with in-phase sinusoid 101 and quadrature-phase sinusoid 103, digitized and filtered (not shown), to generate in-phase receive samples 104a and quadrature-phase receive samples 104b. The in-phase receive samples 104a and quadrature-phase receive samples 104b are demodulated with long channel code 105, and the long code demodulated in-phase and quadrature-phase symbols are further demodulated with both in-phase spreading codes $PN_I$ and quadrature-phase spreading codes $PN_Q$, where $PN_I$ is delayed by half a chip. The $PN_I$ demodulated in-phase symbols are summed with the $PN_Q$ demodulated quadrature-phase symbols producing $X_I$ demodulation symbols 156a. The $PN_I$ demodulated quadrature-phase symbols are summed with the negative of the $PN_Q$ demodulated in-phase symbols producing $X_Q$ demodulation symbols 156b. Integrators 158a and 158b integrate $X_I$ demodulation symbols 156a and $X_Q$ demodulation symbols 156b respectively over four demodulation symbols. Timing adjust 160 receives the integrated demodulation symbols from integrators 158a and 158b and performs timing adjust to compensate for the particular delay incurred during the transmission of the finger being processed, and supplies time adjusted $X_I$ and $X_Q$ demodulation symbols to FHT 109 of FIG. 5.

Figure 7:
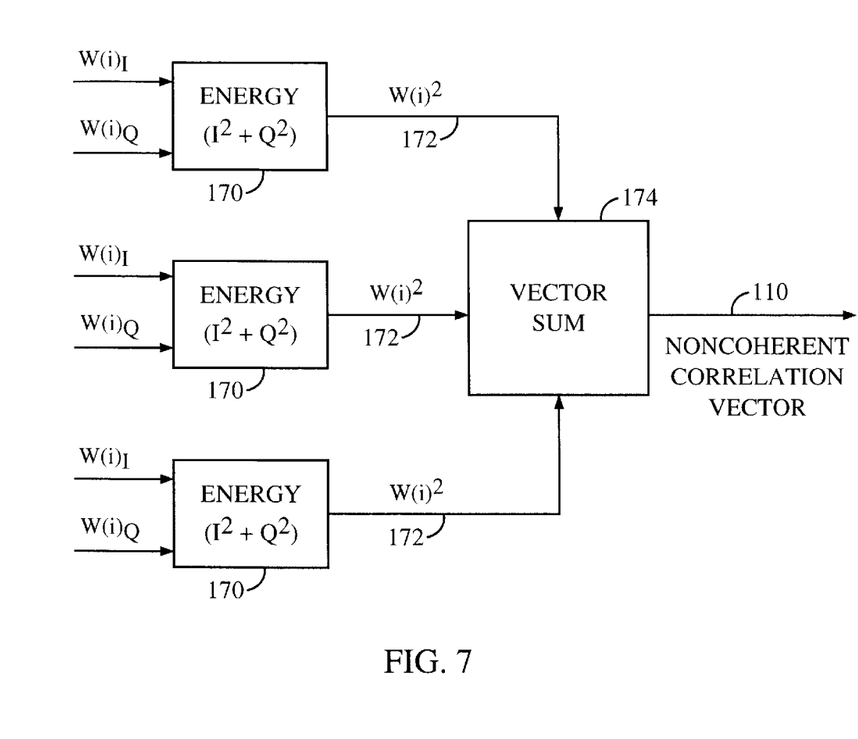
FIG. 7 is a block diagram of a noncoherent combiner configured in accordance with one embodiment of the invention.

FIG. 7 is a block diagram of noncoherent combiner 108 when configured in accordance with the exemplary embodiment of the invention. Walsh symbol correlation vectors $W(i)_I$ and $W(i)_Q$ for each finger being processed are received by energy measurement systems 170 which calculate the energy associated with the finger to generate Walsh energy vectors $W(i)^2$. Vector sum 174 sums the Walsh energy vectors $W(i)^2$ to yield noncoherent correlation vector 110, which may also be referred to as summed correlation energy vectors.

Figure 8:
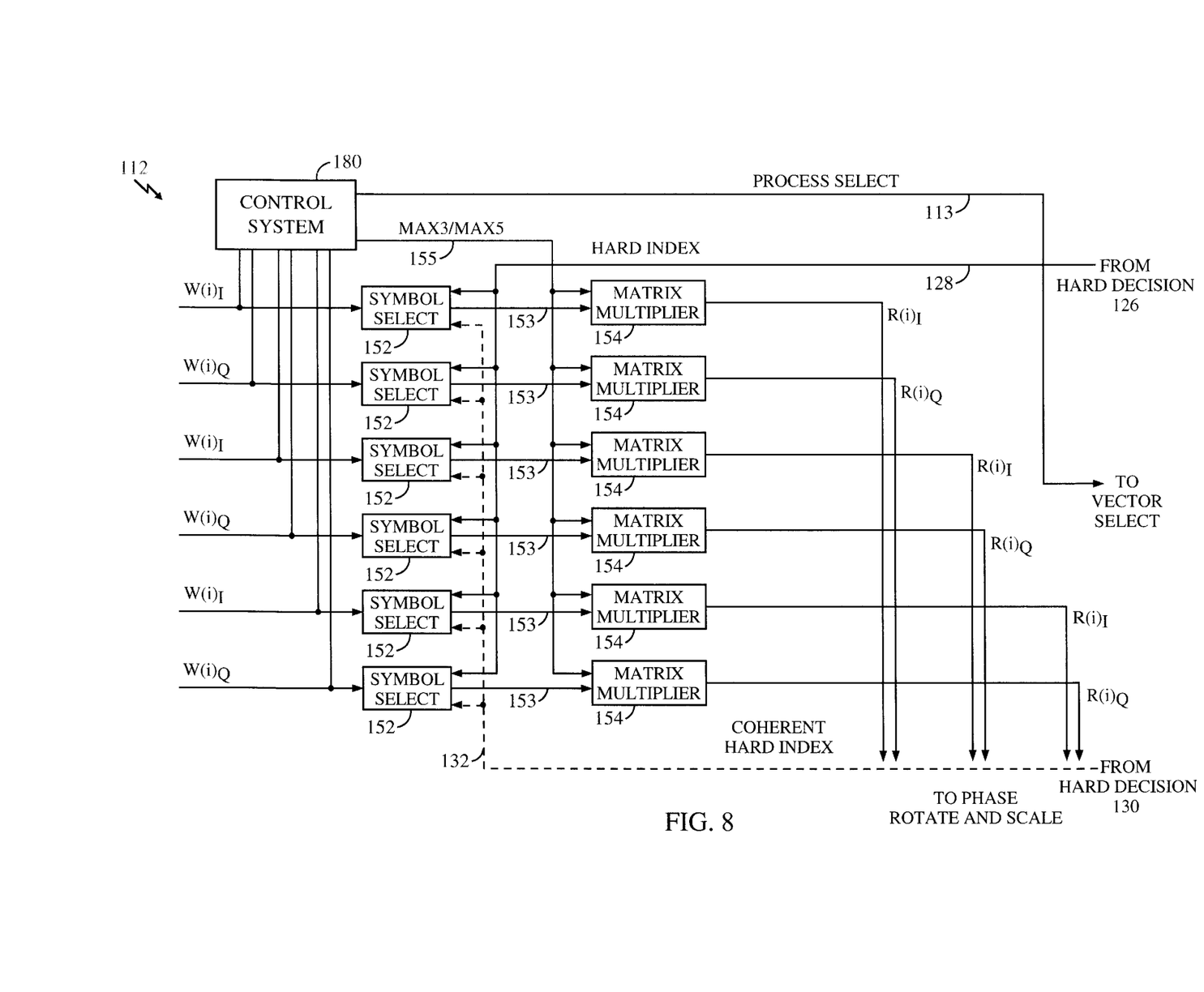
FIG. 8 is a block diagram of reference generator when configured in accordance with one embodiment of the invention.

FIG. 8 is a block diagram of reference generator 112 when configured in accordance with one embodiment of the invention. Delayed Walsh symbol correlation vectors $W(i)_I$ and $W(i)_Q$ are received by control system 180 and symbol selectors 152. Symbol selectors 152 forward the particular Walsh correlation value specified by hard index 128 within Walsh symbol correlation vector $W(i)_I$ or $W(i)_Q$, thereby generating correlation values 153. Forwarding the Walsh correlation value specified by the hard index 128 allows the correlation values 153 to be selected based on the combination of the information contained in the set of fingers being processed, and therefore increases the likelihood of the correct Walsh symbol being selected.

Control system 180 determines the best method of calculating reference values $R(i)_I$ and $R(i)_Q$ using delayed Walsh symbol correlation vectors $W(i)_I$ and $W(i)_Q$, and indicates the best method to matrix multipliers 154 via MAX3/MAX5 indicator 155. MAX3/MAX5 indicator 155 may also be viewed as a rate of phase variation indicator. Matrix multipliers 154 each generate references $R(i)_I$ and $R(i)_Q$ by averaging a series of selected correlation values 153 where the number of selected correlation values 153 is either a maximum of three, or a maximum of five, based on MAX3/MAX5 indicator 155. These in-phase and quadrature-phase reference values are then provided to project and scale systems 116 of FIG. 5.

Control system 180 also generates process select 113 using the Walsh symbol correlation vectors $W(i)_I$ and $W(i)_Q$, as described below. Process select 113 indicates whether noncoherent or coherent processing is more likely to be accurate. Generating the MAX3/MAX5 indicator 155 and process select 113 could be performed in separate systems in alternative embodiments of the invention.

In the preferred embodiment of the invention, a set of in-phase and quadrature-phase references $R(i)_{I,1..6}$ and $R(i)_{Q,1..6}$ are generated for each power control group (PCG) using a corresponding set of selected Walsh symbol correlation vectors $W(i)_{I,1..6}$ and $W(i)_{Q,1..6}$ contained in that PCG, where $W(i)_{I,1}$ is the first in-phase correlation value in a power control group for finger i, and $R(i)_{I,1}$ is the first in-phase reference value for projecting the first in-phase correlation value. (Six Walsh symbols are transmitted in a power control group.) The set of references $R(i)_{I,1..6}$ and $R(i)_{Q,1..6}$ are generated via multiplication of the set of selected Walsh symbol correlation vectors $W(i)_{I,1..6}$ and $W(i)_{Q,1..6}$ with either a MAX3 matrix or a MAX5 matrix. Equations (1) and (2) provide example calculations for generating a set of in-phase phase and scale references with the MAX3 and the MAX5 matrix used in the preferred embodiment of the invention:

$$\begin{bmatrix} R(i)_{I,1} \\ R(i)_{I,2} \\ R(i)_{I,3} \\ R(i)_{I,4} \\ R(i)_{I,5} \\ R(i)_{I,6} \end{bmatrix} = \begin{bmatrix} 1/2 & 1/2 & 0 & 0 & 0 & 0 \\ 1/3 & 1/3 & 1/3 & 0 & 0 & 0 \\ 0 & 1/3 & 1/3 & 1/3 & 0 & 0 \\ 0 & 0 & 1/3 & 1/3 & 1/3 & 0 \\ 0 & 0 & 0 & 1/3 & 1/3 & 1/3 \\ 0 & 0 & 0 & 0 & 1/2 & 1/2 \end{bmatrix} \cdot \begin{bmatrix} W(i)_{I,1} \\ W(i)_{I,2} \\ W(i)_{I,3} \\ W(i)_{I,4} \\ W(i)_{I,5} \\ W(i)_{I,6} \end{bmatrix} \quad (1)$$

$$\begin{bmatrix} R(i)_{I,1} \\ R(i)_{I,2} \\ R(i)_{I,3} \\ R(i)_{I,4} \\ R(i)_{I,5} \\ R(i)_{I,6} \end{bmatrix} = \begin{bmatrix} 1/3 & 1/3 & 1/3 & 0 & 0 & 0 \\ 1/4 & 1/4 & 1/4 & 1/4 & 0 & 0 \\ 1/5 & 1/5 & 1/5 & 1/5 & 1/5 & 0 \\ 0 & 1/5 & 1/5 & 1/5 & 1/5 & 1/5 \\ 0 & 0 & 1/4 & 1/4 & 1/4 & 1/4 \\ 0 & 0 & 0 & 1/3 & 1/3 & 1/3 \end{bmatrix} \cdot \begin{bmatrix} W(i)_{I,1} \\ W(i)_{I,2} \\ W(i)_{I,3} \\ W(i)_{I,4} \\ W(i)_{I,5} \\ W(i)_{I,6} \end{bmatrix} \quad (2)$$

The calculation for the quadrature-phase component is this same except for the use of quadrature-phase Walsh correlation values $W(i)_{Q,1..6}$.

Thus, the reference value is equal to the average over a maximum of three selected Walsh correlation values for the MAX3 matrix, or a maximum of five selected Walsh correlation values for the MAX5 matrix. It should be understood that while the matrices shown are considered optimal for the most commonly experience conditions, particularly when used as described below, the use of other matrices is consistent with the operation of the present invention. Furthermore, while averaging the selected Walsh correlation values over a time span less than or equal to the power control group is highly preferred because in an IS-95 reverse link signal a power control group is the maximum amount of time a constant transmission of data can be ensured, generating reference values by averaging over longer time spans may be employed in alternative embodiments of the invention.

In the preferred embodiment of the invention, the decision performed by control system 180 as to whether the MAX3 matrix or the MAX5 matrix should be used is based on the rate of phase variation of the reverse link signal being processed. The rate of phase variation is a function of various other parameters including the direction and rate of movement of the subscriber unit and any carrier frequency error between the subscriber unit and the base station. In particular, when the rate of phase variation exceeds a first threshold, control system 180 indicates the MAX3 matrix should be used, and when the rate of phase variation falls below that first threshold, control system 180 indicates that the MAX5 matrix should be used. The MAX3 matrix should be used when the rate of phase variation is higher because the difference in the phase offset is greater from Walsh symbol to Walsh symbol, and the total change in phase that occurs over more than three Walsh symbols will be too large to allow a useful average to be generated.

Similarly, the decision as to whether noncoherent combining is more likely to be accurate than coherent combining is also based on the rate of phase variation. In particular, control system 180 indicates that noncoherent combining is more likely to be accurate than coherent combining when the rate of phase variation exceeds a second threshold that is higher than the first. As described above, control system 180 performs this indication via process select 113. In the preferred embodiment of the invention, the first threshold is a rate of phase variation of approximately 30.0 degrees between consecutive Walsh symbols, and the second threshold is a rate of phase variation of approximately 52.5 degrees between consecutive Walsh symbols. The first threshold corresponds to a carrier frequency error of 400 Hz and the second threshold corresponds to a carrier error of 700 Hz.

In one embodiment of the invention, a unique MAX3/MAX5 indicator 155 is generated for each finger being processed, based on the unique rate of phase variation of that finger. This is accomplished by calculating the rate of phase variation using only the Walsh symbol correlation vectors $W(i)_I$ and $W(i)_Q$ associated with finger for which the MAX3/MAX5 indicator 155 is being generated. Calculating a unique MAX3/MAX5 indicator 155 for each finger is useful in environments where the rate of phase variation for each finger varies between fingers.

In a first alternative embodiment of the invention, symbol selectors 152 select correlation values 153 using a combination of hard index 128 and coherent hard index 132 (shown in dashed lines). In a first implementation of this alternative embodiment, symbol selectors use hard index 128 for selecting a first set of correlation values 153 from the Walsh correlation vectors $W(i)_I$ and $W(i)_Q$ in a power control group, and use coherent hard index 132 for selecting a second set of correlation values 153 from the Walsh correlation vectors $W(i)_I$ and $W(i)_Q$ in the power control group. In an exemplary embodiment, hard index 128 is used to select the first two correlation values 153 from the power control group, and coherent hard index 132 is used to select the remaining four correlation values 153 from the power control group. Selecting other numbers of correlation values 153 from the power control group using hard index 128 and coherent hard index 132 is consistent with this alternative embodiment of the invention. The use of coherent hard index 132 increases the likelihood that the correct Walsh symbol will be selected, and as coherent combining provides increased accuracy over non-coherent combining.

In a second alternative embodiment, coherent hard index 132 is used to regenerate the set of references $R(i)_I$ and $R(i)_Q$ for a power control group in iterative fashion. The second set of references are also used to project and scale the delayed Walsh correlation vectors $W(i)_I$ and $W(i)_Q$, which must be further delayed and stored while the second set of references are generated.

In a third alternative embodiment of the invention, the use of vector select 122 as well as the generation of process select 113 are eliminated, and coherent correlation vector 120 is used for further decoding in every instance. This alternative embodiment is useful for wireless telecommunication systems and environments in which the rate of phase variation falls within a more narrow range of values, and therefore the benefit obtained from selecting between the coherently combined and noncoherently combine correlation vectors is reduced. Eliminating the use of vector select 122 and the generation of process select 113 in this case reduces the complexity of the system with little reduction in performance.

In a fourth alternative embodiment of the invention, the same matrix is used every time for generating the references $R(i)_I$ and $R(i)_Q$. This fourth alternative embodiment is also useful for wireless telecommunication systems in which the rate of phase variation falls within a more narrow range of values. In a first variation of this fourth embodiment, the use of a matrix that averages over a greater number of Walsh symbols, such as MAX5, is preferred. This first variation is well suited where the range of rate of phase variation remains relatively low. In a second variation of this fourth embodiment, the use of a matrix that averages over an intermediate number of Walsh symbols, such as MAX3, is preferred. This second variation is well suited where the range of rate of phase variation values is comprised of a set of intermediate values. The use of only one matrix is preferred where the rate of phase variation falls within a more narrow range because the increase in performance obtained from using more than one matrix is not sufficient to justify additional complexity necessary to determine the rate phase variation then select the proper matrix. Of course, other matrices could be used for averaging, such as a matrix that averages over a maximum of four or six Walsh symbols.

Figure 9:
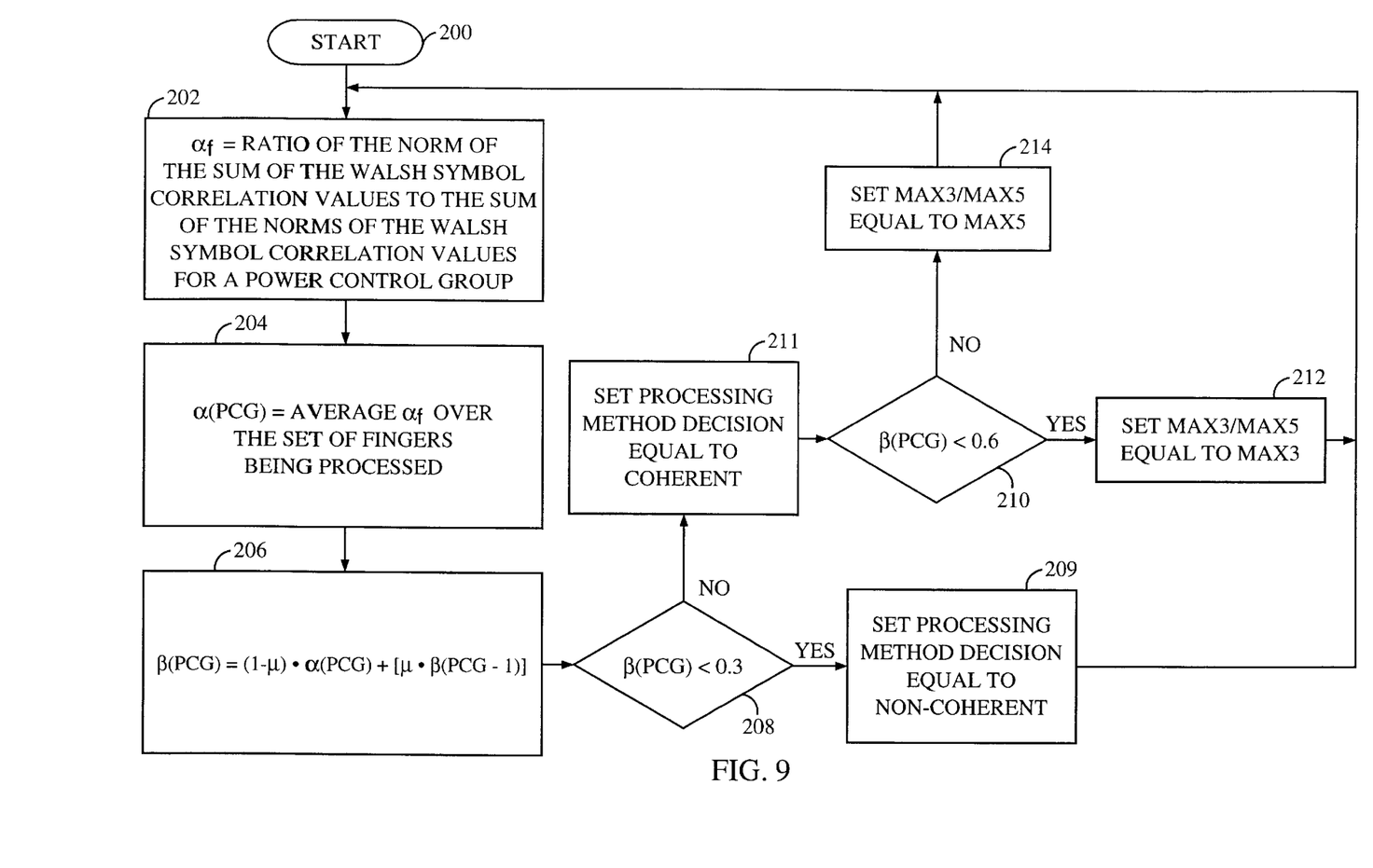
FIG. 9 is a flow chart illustrating the step performed to determine the best type of processing when performed in accordance with one embodiment of the invention.

FIG. 9 is a flow chart illustrating the steps performed by control system 180 to determine the rate of phase variation in accordance with one embodiment of the invention. Those skilled in the art will recognize numerous alternative methods for determining the rate of phase variation of the reverse link signal being processed, and the use of such alternative methods is consistent with the use of the invention. The determination begins at step 200 and at step 202a variable α for each finger $\alpha f$ is set to the ratio of the norm of the sum of the Walsh correlation values to the sum of the norms of the of the Walsh correlation values which can be represented as:

$$\alpha_f = \frac{\left\|\sum_{s=1}^{6} W(f), s\right\|}{\sum_{s=1}^{6} \|W(f), s\|} \tag{3}$$

where, $W(f),s$ is the $s^{th}$ selected Walsh correlation symbol of a power control group in finger $f$ and the norm of the complex value is equal to its magnitude. At step 204 the $\alpha f$ for a power control group ($\alpha(PCG)$) is calculated as the average $\alpha f$ for the set of fingers being processed which can be expressed as:

$$\alpha(PCG) = \frac{1}{f_{max}} \sum_{f=1}^{f_{max}} \alpha_f \tag{4}$$

At step 206a value β(PCG) is calculated as the average of a set of exponentially decreased values α(PCG) as follows:

$$\beta(PCG)=(1-\mu)\cdot\alpha(PCG)+(\mu\cdot\beta(PCG-1)) \tag{5}$$

where $\mu$ is the forgetting factor of the exponential window and in the preferred embodiment is set to 0.95. At step 206 it is determined whether β(PCG) is less that 0.3, and therefore if the rate of phase variation exceeds the second threshold. If so, process select 113 is set to noncoherent at step 209, and step 202 is performed again. If it is, however, determined at step 208 that β(PCG) exceeds 0.3, and therefore if the rate of phase variation is below the second threshold, process select 113 is set to coherent at step 211. At step 210 it is determined if β(PCG) is less than 0.6, and therefore if the rate of phase variation exceeds the first threshold. If so, MAX3/MAX5 indicator 155 is set to MAX3 at step 212 and control system 180 returns to step 202. If, however, is determined at step 210 that β(PCG) exceeds 0.6, and therefore that the rate of phase variation is below the first threshold, MAX3/MAX5 indicator 155 is set to MAX5 at step 214 and step 202 is performed.

Figure 10:
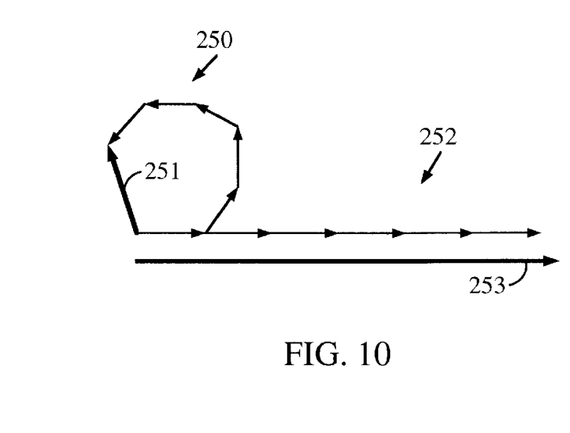
FIG. 10 is a vector diagram illustrating the use of the above described method for calculating the rate of phase variation.

FIG. 10 is a vector diagram illustrating the use of the above described method for calculating the rate of phase variation over a power control group by showing the six pairs of Walsh correlation values configured as phase vectors 250 and normalized vectors 252. Phase vectors 250 are positioned front to end yielding summed vector 251, the magnitude of which is obtained by taking the norm of summed vector 251. Normalized vectors 252 are positioned front to end yielding sum of the norms vector 253. As can be seen, where the phase changes from one phase vector 250 to the next phase vector 250, the magnitude of summed vector 251 is reduced with respect to the magnitude of the sum of the norms vector 253 because phase vectors 250 do not add in a completely constructive manner. Thus, by measuring the ratio of the norm of the sums to the sum of the norms, the rate of phase variation can be determined. As noted above, various alternative methods for measuring the rate of phase variation will be apparent to one skilled in the art.

Figure 11:
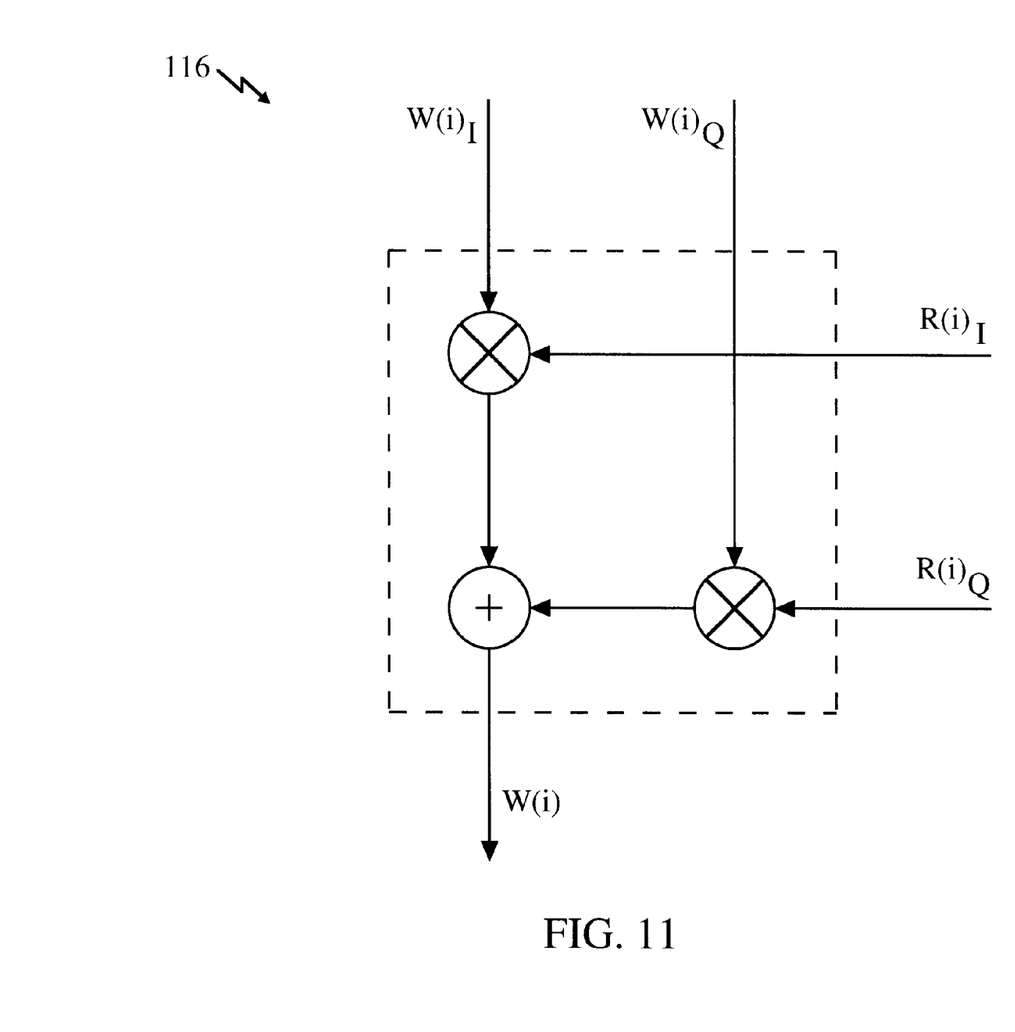
FIG. 11 is a block diagram of a project and scale system configured in accordance with one embodiment of the invention.

FIG. 11 is a diagram of a project and scale system 116 when configured in accordance with the exemplary embodiment. After being further delayed by delay 117 (FIG. 5) while reference generator 112 performs the processing described above, Walsh symbol correlation vectors $W(i)_I$ and $W(i)_Q$ are multiplied by references $R(i)_I$ and $R(i)_Q$ respectively, and the resulting terms summed to generate real Walsh symbol correlation vectors $W(i)$. A circuit for performing such a projection is described in U.S. Pat. No. 5,506,865 entitled "PILOT CARRIER DOT PRODUCT CIRCUIT" assigned to the assignee of the present invention and incorporated herein by reference. The real Walsh symbol correlation vectors $W(i)$ are forwarded to coherent combiner 118. Referring again to FIG. 5, vector select 122 of FIG. 5 then outputs noncoherent correlation vector 110 or coherent correlation vector 120 to soft decision 134 based on process select 113.

To further illustrate the usefulness of the present invention, the results of various simulations performed on a personal communications systems (PCS) band wireless telephone system run under different conditions are provided below. The noncoherent demodulation performance is also provided as a reference. The simulations were all run at PCS frequency (1,870 MHz) and with full rate frames of 14.4 kbps. The different parameters tested to evaluate the overall performance include:

Simulation of up to 10,000 frames or 500 frame errors.

Coherent Walsh demodulation using MAX3 and MAX5 matrices.

Additive White Gaussian Noise (AWGN) and Rayleigh (lakes) channels.

Power control with 4% feedback BER.

2 m/s (4.5 mph, 7.2 kmh), 30 m/s (67 mph, 108 kmh), 45 m/s (100 mph, 160 kmh).

Carrier frequency errors.

Equal and unequal paths (−3 dB).

The Rayleigh Gakes) envelope distribution used for the fading paths models composite signals with Doppler frequency offsets from minus to plus the maximum reverse (or forward) Doppler expected. In addition to the reverse link frequency error included in the Rayleigh fading model, and since the subscriber unit tracks the average forward link frequency the worst case results from the inaccuracy of the subscriber unit frequency translation. The maximum allowed error in frequency translation is 150 Hz (see ANSI J-STD-008, 2.1.1.2 also incorporated herein by reference). For cellular subscriber unit a translation of up to 300 Hz is allowed by the standards.

When there is a strong specular component (e.g., with the AWGN-only cases used here), the subscriber unit will track the Doppler-offset frequency of that component and use that as a reference for the reverse link. So the resulting worst case frequency error seen by the base station is equal to the frequency translation error plus the sum of the forward and reverse link Doppler offsets. The 540 Hz and 731 Hz offsets used in the AWGN-only simulations are for a 150-Hz translation error, forward-plus-reverse Doppler frequencies for the maximum forward-plus-reverse frequency of 3,900 MHz and subscriber unit-to-base station velocity of 67 and 100 mph respectively.

The main issues addressed by the simulations are the effect of speed, carrier frequency offsets and weak paths. Tables I–V are a summary of those results. They give the mean required information bit energy-to-interference ratio (Eb/Io) per path for a 1% FER. They also show the gain of MAX3 and MAX5 over the noncoherent demodulation.

TABLE I

AWGN, 2 equal paths
1870 MHz, 14.4 kbps (full rate), 2-paths AWGN, Power Control Disabled

| Speed | Carrier f Error | Noncoherent | Coherent MAX3 | | Coherent MAX5 | |
|---|---|---|---|---|---|---|
| m/s (mph) | Hz | Eb/Io [dB] | Eb/Io [dB] | Gain [dB] | Eb/Io [dB] | Gain [dB] |
| 0.0(0.0) | 0 | 2.25 | 1.70 | 0.55 | 1.40 | 0.85 |
| 30(67) | 540 | 2.45 | 2.20 | 0.25 | 2.80 | −0.35 |
| 45(100) | 731 | 2.60 | 2.65 | −0.05 | 4.45 | −1.85 |

TABLE II

Rayleigh, 2 equal paths
1870 MHz, 14.4 kbps (full rate), 2-equal-paths Rayleigh Fading,
Power Control Enabled with 4% Feedback BER

| Speed | Carrier f Error | Noncoherent | Coherent MAX3 | | Coherent MAX5 | |
|---|---|---|---|---|---|---|
| m/s (mph) | Hz | Eb/Io [dB] | Eb/Io [dB] | Gain [dB] | Eb/Io [dB] | Gain [dB] |
| 2.0(4.5) | 0 | 5.05 | 4.45 | 0.60 | 4.05 | 1.00 |
|  | 150 | 5.00 | 4.50 | 0.50 | 4.25 | 0.75 |
| 30(67) | 0 | 6.05 | 5.25 | 0.80 | 4.90 | 1.15 |
|  | 150 | 6.00 | 5.25 | 0.75 | 5.10 | 0.90 |
| 45(100) | 0 | 5.75 | 5.00 | 0.75 | 4.65 | 1.10 |
|  | 150 | 5.75 | 5.00 | 0.75 | 4.85 | 0.90 |

TABLE III

Rayleigh, 4 equal paths
1870 MHz, 14.4 kbps (full rate), 4-equal-paths Rayleigh Fading,
Power Control Enabled with 4% Feedback BER

| Speed | Carrier f Error | Noncoherent | Coherent MAX3 | | Coherent MAX5 | |
|---|---|---|---|---|---|---|
| m/s (mph) | Hz | Eb/Io [dB] | Eb/Io [dB] | Gain [dB] | Eb/Io [dB] | Gain [dB] |
| 2.0(4.5) | 0 | 1.45 | 0.95 | 0.50 | 0.50 | 0.95 |
|  | 150 | 1.45 | 0.95 | 0.50 | 0.60 | 0.85 |
| 30(67) | 0 | 2.60 | 2.00 | 0.60 | 1.40 | 1.20 |
|  | 150 | 2.60 | 2.10 | 0.50 | 1.55 | 1.05 |

TABLE IV

Rayleigh, one 0 dB and one −3 dB path
1870 MHz, 14.4 kbps (full rate), 2-paths Rayleigh Fading,
Power Control Disabled, 1 Weak Path (−3 dB)

| Speed | Carrier f Error | Noncoherent | Coherent MAX3 | | Coherent MAX5 | |
|---|---|---|---|---|---|---|
| m/s (mph) | Hz | Eb/Io [dB] | Eb/Io [dB] | Gain [dB] | Eb/Io [dB] | Gain [dB] |
| 30(67) | 0 | 6.45 | N/A | N/A | 5.45 | 1.00 |

TABLE V

Rayleigh, two 0 dB and two -3 dB paths
1870 MHz, 14.4 kbps (full rate), 4-paths Rayleigh Fading,
Power Control Disabled, 2 Weak Paths (−3 dB)

| Speed | Carrier f Error | Noncoherent | Coherent MAX3 | | Coherent MAX5 | |
|---|---|---|---|---|---|---|
| m/s (mph) | Hz | Eb/Io [dB] | Eb/Io [dB] | Gain [dB] | Eb/Io [dB] | Gain [dB] |
| 30(67) | 0 | 2.70 | N/A | N/A | 1.60 | 1.10 |

Figure 12:
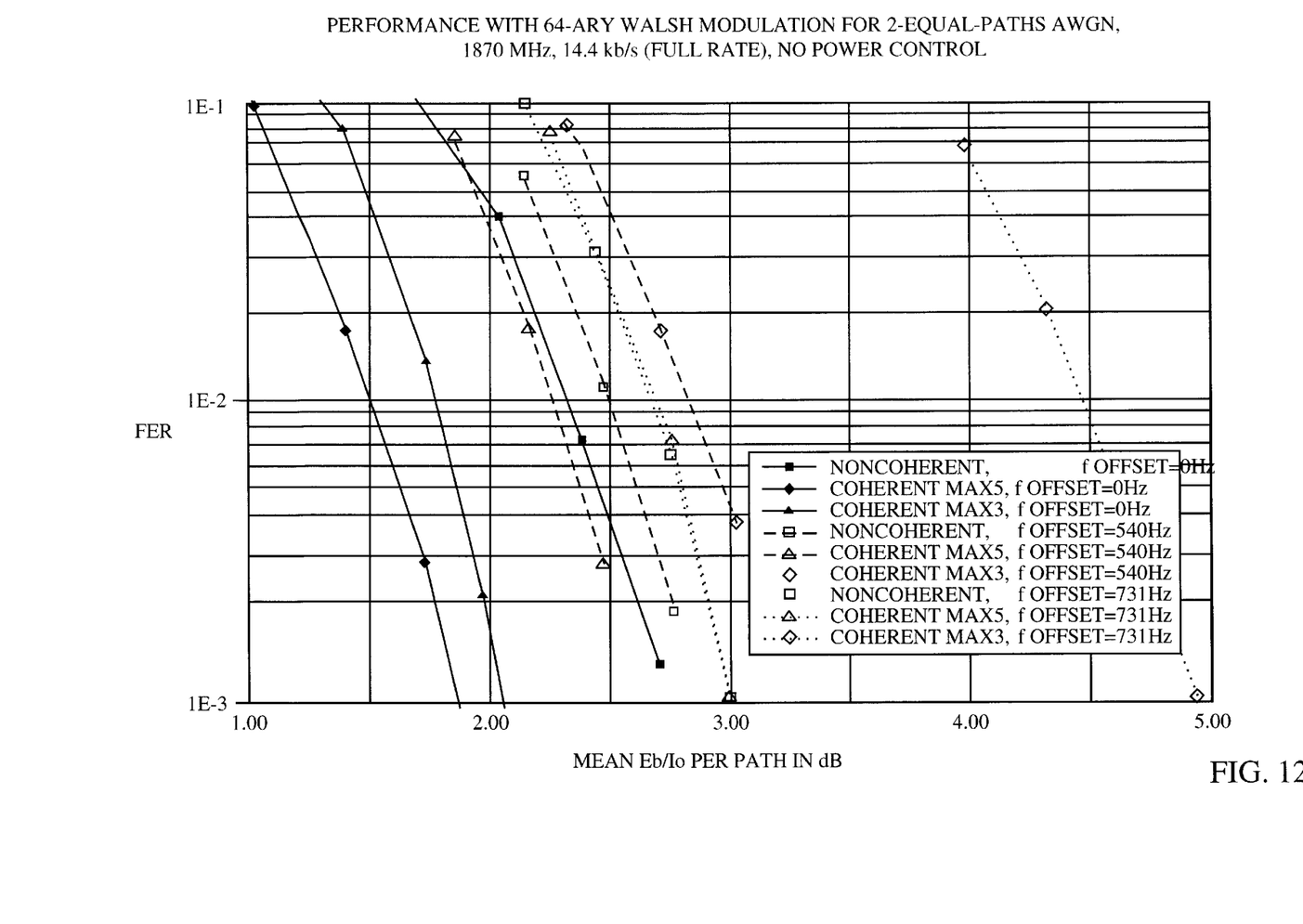
FIG. 12 is a graph illustrating the simulation results performance at various frame error rates (FER).

Thus, without carrier frequency error MAX3 is 0.55 to 0.8 dB better and MAX5 is 0.85 to 1.2 dB better than the noncoherent demodulation. In Rayleigh fading the frequency error decreases the previous gains by at most 0.2 dB. However, the carrier frequency error has a greater effect in AWGN: the performance of MAX3 is equivalent to noncoherent and MAX5 is 2 dB worse. FIG. 12 is a graph illustrating the simulation results performance at various frame error rates (FER). Overall, the coherent demodulation yields an Eb/Io processing gain of about 1 dB in most cases, which is approximately a 26% increase in capacity.

Thus, a method and apparatus for coherently processing a CDMA signal without the use of pilot or other synchronization information has been described. By utilizing a receive processing system as described above, a reverse link signal can be properly processed when received at a lower power level than that associated with noncoherent only processing. This reduces the transmit power necessary for successful communication, and this reduction in necessary transmit power reduces the degree to which a set of subscriber units communicating with the same base station interfere with one another. In turn, this increases the overall system capacity of a CDMA wireless telecommunication system incorporating the invention. One skilled in the art will recognize various alternative methods and apparatus for implementing the invention. The particular embodiment described above is provided for illustrative purposes, and should not be construed as limiting the scope of the invention.

We claim:

1. A method for coherent receive processing a set of multipath signals comprising the steps of:

a) calculating a set of phase references from data contained in the corresponding set of multipath signals, said set of phase references corresponding to the set of multipath signals;

b) projecting said set of multipath signals using said set of phase references yielding a set of projected multipath signals; and c) combining said set of projected multipath signals.

2. The method as set forth in claim 1 wherein step a) is performed via the steps of:

a.1) generating a set of in-phase references corresponding to the set of multipath signals; and a.2) generating a set of quadrature-phase reference corresponding to the set of multipath signals.

* * * * *